Sept. 18, 1945.  R. K. HOPKINS  2,385,136
APPARATUS FOR PRODUCING METAL BODIES
Filed April 21, 1943  5 Sheets—Sheet 1

FIG. 1.

INVENTOR.
ROBERT K. HOPKINS,
BY Virgil F. Davies
ATTORNEY.

Sept. 18, 1945.	R. K. HOPKINS	2,385,136
APPARATUS FOR PRODUCING METAL BODIES
Filed April 21, 1943	5 Sheets-Sheet 2

INVENTOR.
ROBERT K. HOPKINS,
BY
Virgil F. Davies
ATTORNEY.

Sept. 18, 1945.  R. K. HOPKINS  2,385,136
APPARATUS FOR PRODUCING METAL BODIES
Filed April 21, 1943  5 Sheets-Sheet 4

INVENTOR.
ROBERT K. HOPKINS,
BY
Virgil F. Davis
ATTORNEY

Sept. 18, 1945.   R. K. HOPKINS   2,385,136
APPARATUS FOR PRODUCING METAL BODIES
Filed April 21, 1943    5 Sheets-Sheet 5

INVENTOR,
ROBERT K. HOPKINS,
BY Virgil F. Davies
ATTORNEY.

Patented Sept. 18, 1945

2,385,136

UNITED STATES PATENT OFFICE 2,385,136

APPARATUS FOR PRODUCING METAL BODIES

Robert K. Hopkins, New York, N. Y., assignor to The M. W. Kellogg Company, New York N. Y., a corporation of Delaware Application April 21, 1943, Serial No. 483,967

19 Claims. (Cl. 22—61)

This invention relates to novel apparatus for the production of consistently uniform semi-finished metal bodies from raw materials in a single continuous operation in which the raw materials are continuously supplied to a mold space and there continuously converted into the desired metal by heat supplied through the discharge of electric current through a gap, or gaps, submerged beneath a blanket of protective flux. For a disclosure of this type of operation reference may be had to my prior Patent No. 2,191,479 of February 9, 1940.

The cost of the metal bodies produced by operations of the type referred to, is materially effected by the proportion of the work day that the apparatus is not actually engaged in producing metal. The non-productive time of the apparatus is taken up by the necessary preparations for each individual run, by the steps employed in the final solidification of the metal body, by the removal of the finished product, etc. The cost of the final product is also affected by variations in the quality of the product that result from departures from established operating conditions by reason of apparatus adjustments left within the discretion of the operator of the apparatus.

It is one of the primary objects of this invention to provide novel apparatus for producing metal bodies, by the method above referred to, which is so constructed and arranged that it can produce metal throughout the work day with a minimum of interruption.

It is also a primary object of the invention to provide novel apparatus of the character mentioned that is so constituted and arranged that it requires a minimum of adjustments and such adjustments as are required can be made quickly and accurately without possibility of upsetting preestablished operating conditions.

It is also one of the main objects of the invention to provide novel apparatus of the character mentioned which includes novel mold support arrangements by means of which the mold means may be placed into and out of metal producing position and into and out of metal finishing position quickly and accurately so that interruptions in metal production are reduced to a minimum.

The further objects and advantages of the invention will become apparent from the following description of a present preferred embodiment thereof taken with the accompanying drawings, in which.

The apparatus of the invention is of general application and may be successfully employed in the production of semi-finished metal bodies of both ferrous and non-ferrous metals and alloys. The novel apparatus probably finds its greatest use in the production of semi-finished bodies of ferrous alloys, especially those alloys that contain comparatively large proportions of alloying elements such as chromium, nickel, manganese, vanadium, tungsten, molybdenum, silicon, columbium, aluminum, etc., alone or in combination.

The various elements of the novel apparatus are supported on a structure 10, formed of structural shapes 11. At the top of structure 10 is a plurality of hoppers 12 in which are kept the raw materials in granular form required in the operation. The granular raw materials pass from hoppers 12 to metering devices in housing 13 from whence they pass at the chosen metered rates into tube 14 that conducts them into hollow electrode 15. Electrode 15 is fed and formed by forming rolls mounted in casing 16. The electrode forming and feeding rolls are driven by motor 17. Motor 17 may be controlled, as by means of arc control arrangement common in the electric furnace and electric welding arts, to form and feed electrode 15 as required to maintain a discharge of predetermined characteristics from its end. It is at present preferred, however, especially when alternating current is discharged from the end of electrode 15, to operate motor 17 at a constant speed and adjust the current supply as required to fuse electrode 15 at the rate supplied. Electrode 15 is formed by shaping the flat strip 18 carried on reel 19.

The apparatus elements above referred to, are completely described, and the manner of employing them in the production of metal bodies of desired analysis fully set forth in my prior Patent No. 2,191,479. This patent also includes a complete disclosure of the method by which the desired metal is produced and solidified, as well as a disclosure of the flux employed, the choice and proportioning of the raw materials, etc. In view of this prior disclosure no effort will be made here to set out method and operational details not directly concerning the novel features of the present invention.

Figure 1:
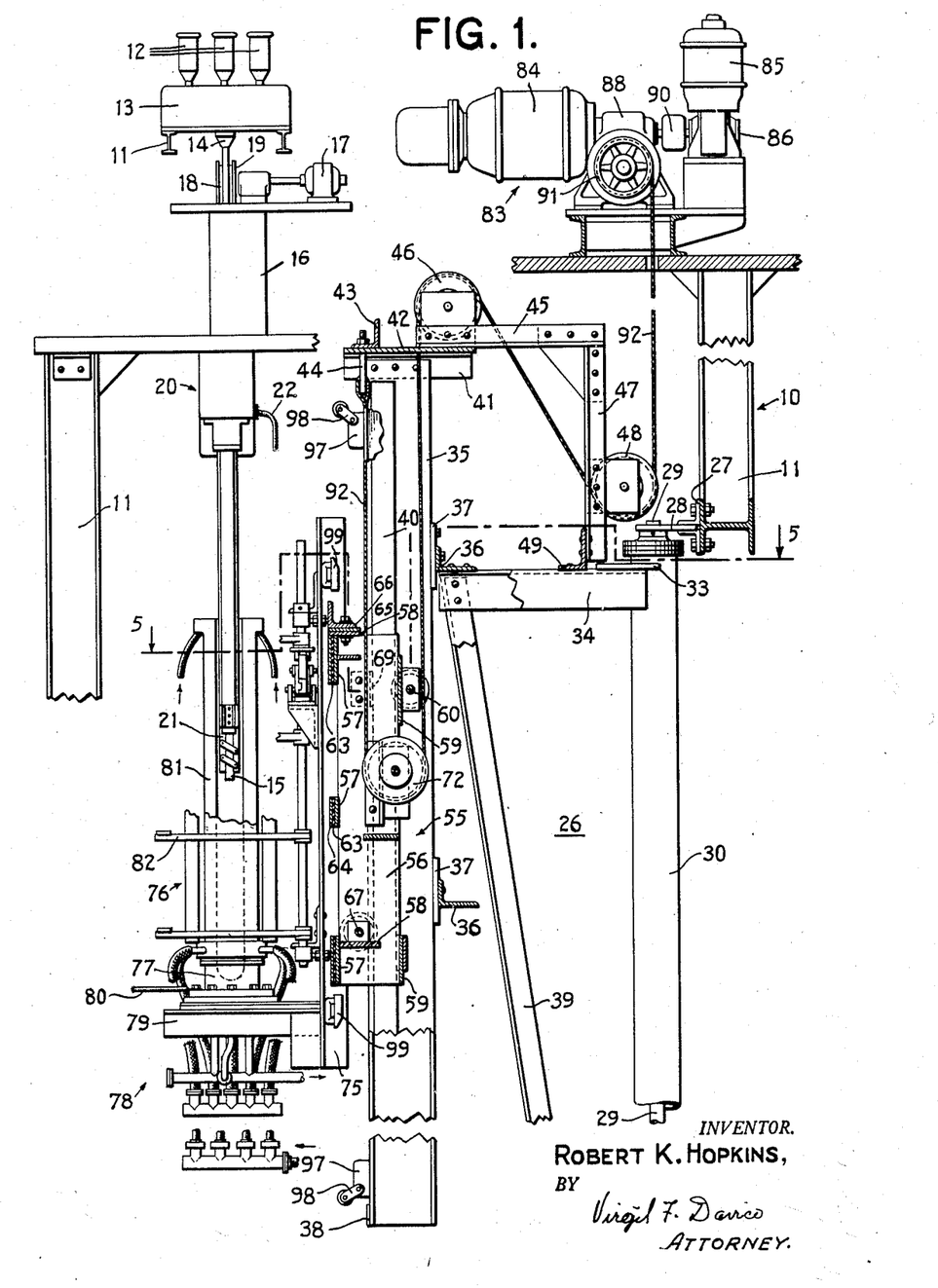
Fig. 1 is a front view, with parts broken away and with parts in section, of an apparatus installation incorporating a present preferred embodiment of the invention, in this figure a portion of the installation, a mirror image of that shown has been omitted.

The apparatus elements referred to above have, in Fig. 1, been shown on a smaller scale than the remainder of the apparatus elements of the invention, also, these elements have been moved down somewhat from their true positions, this has been done in order to better illustrate the apparatus elements with which the invention is primarily concerned.

Electrode 15 passes from the forming and feeding rolls through contact device 20 which terminates in contact shoes 21 that bear on electrode 15 and conduct the electric current thereto. One side of the electric current supply is connected to contact device 20 through cable 22. Contact device 20 may be of any usable form, and since per se it does not form part of the invention, it will not be described in detail here. Contact device 20 should be long enough to support electrode 15 against pronounced lateral movement.

Figure 2:
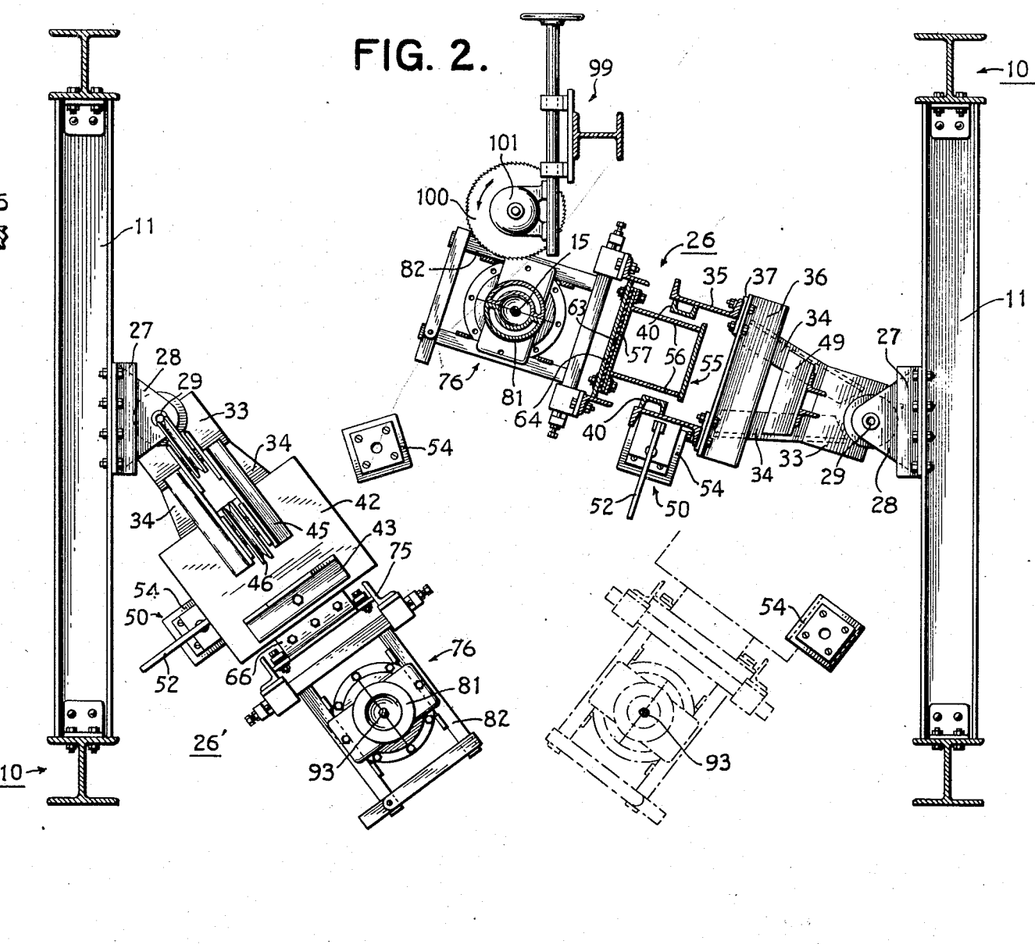
Fig. 2 is a plan view, with parts broken away and parts in section, showing both portions of the apparatus installation.
Figures 3, 4:
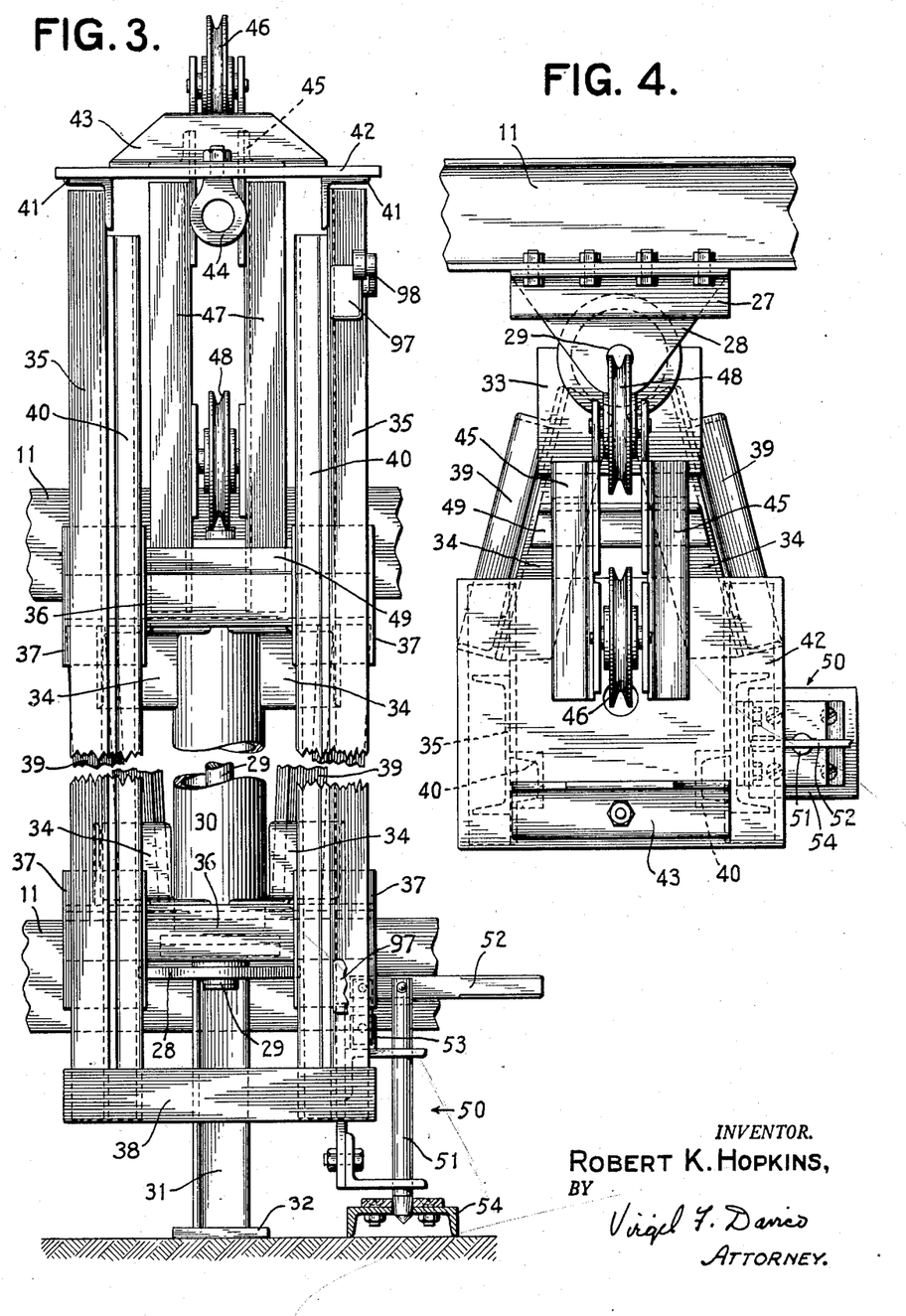
Figs. 3 and 4 are, respectively, a front view and a plan view of a supporting frame arrangement.

A pair of mold supporting arrangements 26 and 26' are provided below the level of the electrode forming rolls. As best shown in Fig. 2, the arrangements 26 and 26' are disposed one on each side of electrode 15 and are supported from members 11 of structure 10 for swinging movement beneath electrode 15 and electrodes 93. Arrangements 26 and 26' are identical and are identically supported so that a description of one of them will suffice for both.

To each of a pair of spaced horizontal members 11 of structure 10 is attached a pair of angle pieces 27. Between each pair of angle pieces 27 is fastened a triangular support plate 28 having a hole therethrough. The holes in plates 28 are aligned. One end of a shaft 29 extends through the hole in top plate 28. The other end of shaft 29 is encircled by a half of a thrust bearing. The half of the bearing and the encircled end of the shaft 29 pass through the hole in the bottom plate 28 to seat the half of the thrust bearing on bottom plate 28.

A hollow standard 30 concentrically encloses shaft 29 and houses at its lower end the other half of the thrust-bearing above mentioned. A radial bearing is also interposed between standard 30 and shaft 29 adjacent their lower ends. A short angle member 31, united to foot plate 32, is attached to the bottom of plate 28 adjacent the hole therein and serves to support the weight of standard 30 and the apparatus carried by it.

A radial bearing is positioned between standard 30 and shaft 29 adjacent their upper ends. A cap is positioned above this radial bearing and a set collar provided above the cap. The set collar provides a means which together with the bottom thrust bearing limits the longitudinal movement of shaft 29.

Attached adjacent the upper and lower ends of standard 30 are rectangular plates 33. Angle pieces 34 are attached to plates 33 and extend toward vertical channels 35.

The ends of angle pieces 34 adjacent vertical channels 35 are united to angle pieces 36 which span the space between vertical channels 35. Angle pieces 36 are united to plates 37 which in turn are united to vertical channels 35. Plates 37 are preferably machined on their major faces so that the elements united to them may be accurately positioned. A pair of plates 37 and an angle piece 36 are also provided on vertical channels 35, between the pairs of plates 37 at the ends of angles 34, to further stiffen the frame formed by vertical channels 35. The bottom ends of vertical channels 35 are united to a plate 38 to give further rigidity to the frame formed by the channels. Angle pieces 39 are united to opposite ends of the angle pieces 34 on the same side of the frame to also increase the strength and rigidity of the structure.

Figures 5, 6:
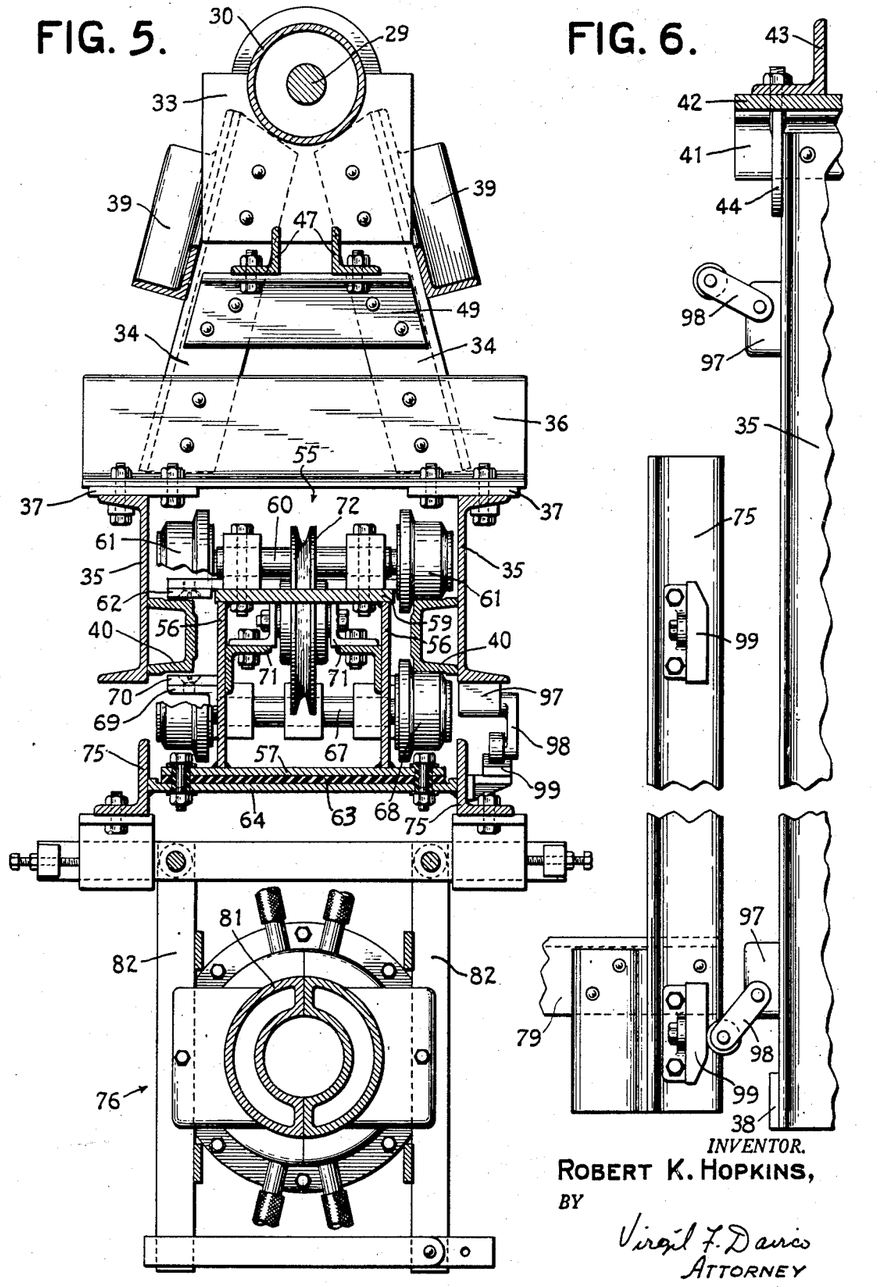
Fig. 5 is a sectional view taken on line 5—5 of Fig. 1.
Fig. 6 is a fragmentary side view of the structure of Fig. 5, Figs. 7 and 8 are, respectively, a plan view and a diagrammatic showing, of one of the hoist arrangements employed, and, Fig. 9 is a front view of one of the finishing electrodes.
Figure 7:
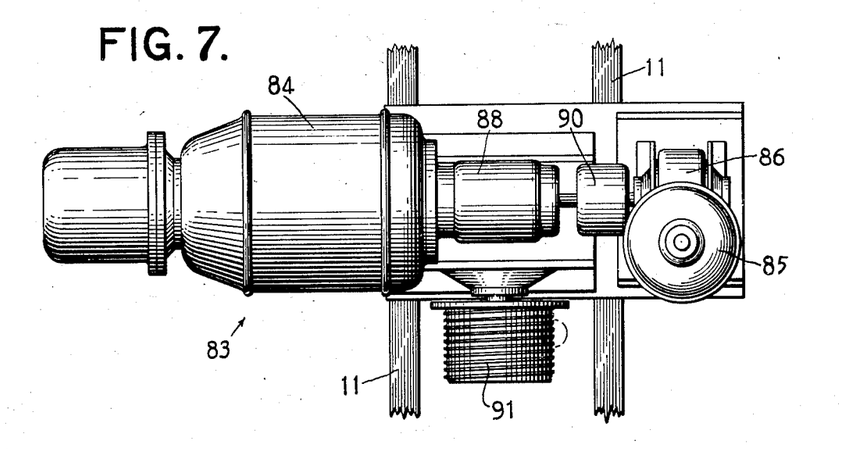
Figure 8:
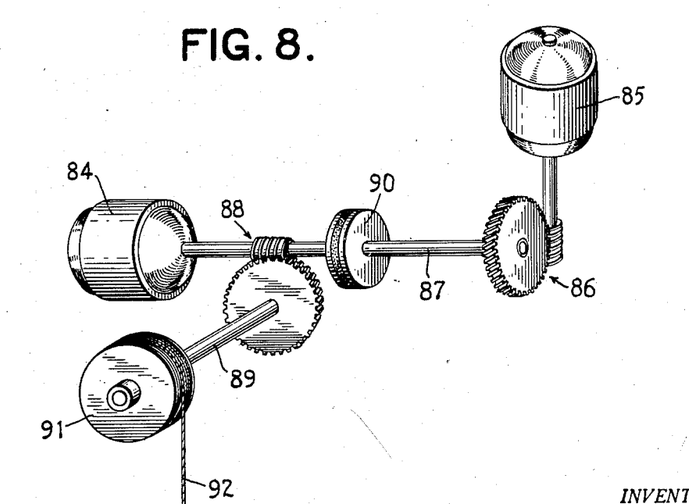

To the face of each vertical channel 35 is united a vertically disposed ships-channel 40 which is machined as shown in Fig. 5 to provide smooth and straight guide-ways for rollers hereinafter mentioned. To the top of channels 35 are united angle pieces 41 which carry thereon and attached thereto a top plate 42. A reenforcing angle piece 43 is carried across top plate 42. A hole is provided in angle piece 43 and top plate 42 to accommodate an eye-bolt 44 which serves as the anchor for a cable hereinafter mentioned.

A pair of angle pieces 45 are also attached to the top of plate 42. To these angle pieces are united bearing plates in which are journalled the ends of the shaft of sheave 46. The projecting ends of angle pieces 45 are united to vertically disposed angle pieces 47 that carry bearing plates in which the ends of the shaft of sheave 48 are journalled. The ends of angle pieces 47 are bolted to an angle piece 49 that is united to and straddles angle pieces 34.

To the bottom end of one of channels 35 is attached a locking device 50 which includes a pin 51 and actuating handle 52. Pin 51 is pivoted to handle 52 and passes through guide holes in the webs of short angle pieces forming a part of the arrangement. The end of handle 52 is pivoted to one end of a link 53, the other end of link 53 is pivoted to a support piece carried by one of the angle pieces. Pin 51 is moved into a hole in channel 54 which is affixed to the floor to hold arrangement 26 immovable. As shown in Fig. 2, arrangement 26 has associated therewith two channel pieces 54. Each of these pieces is accurately positioned and since they are immovable arrangement 26 can be brought into and locked in either operating position quickly and accurately. Arrangement 26' has also associated therewith two channel pieces 54.

The mold support arrangement 26 also includes a vertically movable mold carriage 55. This carriage includes a pair of parallel spaced rectangular plates 56 that are formed into a rigid box frame by plates 57, plates 58 and plates 59 united thereto. The top one of plates 59 is provided with holes for bolting thereto the supports of shaft 60. At the ends of shaft 60 are mounted, through suitable roller bearings, rollers 61 that ride on one set of the machined guide-ways of channels 40. The bottom one of plates 59 has attached to it a plate that carries rubbing plates 62. Rubbing plates 62 are adapted to contact the machined guide-ways of channels 40 if a movement is set up tending to carry rollers 61 away from the guide-ways. Plates 57 extend beyond the box frame and have holes therein to accommodate the bolts that fasten plates 63 and 64 to them. Plates 63 are made of insulating material and suitable insulation bushings and washers are provided for insulating plates 57 from the connecting bolts.

The top one of plates 58 is also provided with holes therein. These holes accommodate the bolts that fasten insulation plate 65 and angle piece 66 to it; suitable insulation bushings and washers are also provided for insulating the top plate 58 from the connecting bolts. The bottom one of plates 58 has united thereto bearing plates in which is mounted the shaft 67. Rollers 68 are mounted through suitable roller bearings on the ends of shaft 67. Rollers 68 are adapted to ride on the other set of the machined guide-ways of channels 40. In line with the supports for shaft 60 and on the outside faces of plates 56 are attached angle pieces 69 which carry rubbing plates 70. Rubbing plates 70 are adapted to contact the guide-ways of channels 40 when forces are set up tending to carry rollers 61 and 68 off their guide-ways. Intermediate the ends of plates 56 are attached angle pieces 71 that carry the bearing supports for the roller bearing upon which sheave 72 is mounted.

Plates 64 carry at their ends and attached thereto vertical angle pieces 75 to which is bolted the arrangement 76 which supports the mold forming elements. Any form of mold suitable for the purpose in hand may be used and it may be formed of any suitable materials. Thus, the mold may be of metal or of ceramic material or of a combination thereof and may or may not be cooled by a suitable cooling medium. At present, molds having their metal shaping walls made of copper or similar metal of high heat conductivity are preferred. Also, the mold may be a one-piece structure or a multi-piece structure. The full advantages of the invention are better realized with a multi-piece mold which includes a body portion split in a vertical plane. Such a mold has been shown. The mold and the arrangement 76 for supporting it shown have been disclosed at length in my copending application Serial No. 451,879 so that a brief description here will suffice.

The mold includes a bottom member 77 having a substantially hemi-spherical depression therein in which the metal producing operation is begun. Mold bottom member 77 is hollow and is connected to conduits 78 for circulation of water, or other preferred cooling medium, therethrough. Mold bottom member 77 is supported on members 79 that are fixedly connected to vertical angle pieces 75. A cable 80 connects mold bottom 77 to one side of the electric current source, either A. C. or D. C., used in the metal producing operations and to the positive side of the D. C. source used in the finishing operations.

Mold body element 81 is formed of two complementary halves. The halves are hollow and are also connected to conduits 78 for circulation of the cooling medium therethrough; the halves may also connect to cable 80. The halves of mold body element 81 are supported on frames 82 which are swingably mounted to carry the halves into and out of mold forming position. Mechanism is also associated with frames 82 so that mold body element 81 may be lowered on or raised from mold bottom element 77. By means of these mold elements and their support arrangements the mold may be quickly prepared for the metal producing operation and at its completion the metal body produced may be quickly and easily removed and the mold closed and prepared for the next metal producing operation.

Above each of mold support arrangements 26 and 26' is positioned on a suitable platform a hoist arrangement 83 for raising and lowering mold carriage 55. The hoist arrangement 83 includes hoist motors 84 and 85. Each of these motors is reversible and may be driven at any one of a plurality of speeds. With each motor is incorporated a reducing gear train. Reducing train 86 of motor 85 is such as to reduce the speed of output shaft 87 to one sixtieth of that of the armature shaft of this motor. The reducing gear train 88 of motor 84 is such as to reduce the speed of the output shaft 89 to one one hundred and fifty-fourths that of the armature shaft of motor 84. These speed reducers are chosen as satisfactory for an apparatus set up designed to a particular set of conditions. It is to be understood that these values are illustrative only and that any required values may equally well be employed. The output shaft 87 may be coupled and uncoupled through magnetic clutch 90 to the armature shaft of motor 84.

The wiring circuit of motors 84 and 85 and magnetic clutch 90 is such that when motor 84 is energized to drive shaft 89 in either direction motor 84 and magnetic clutch 90 are deenergized and shaft 87 is uncoupled from the armature shaft of motor 84. Also, when motor 85 is energized to drive in either direction, magnetic clutch 90 is energized and operates to couple output shaft 87 with the armature shaft of motor 84 while motor 84 is deenergized. The wiring diagram has not been shown nor will it be described in detail here as the wiring of motors 84 and 85 and clutch 90 to function as above described is well within the skill of the ordinary mechanic.

By means of arrangement described above, shaft 89, upon which is mounted cable drum 91 may be rotated in either direction solely under the influence of motor 84 and gear train 88 or shaft 89 may be rotated in either direction under the influence of motor 85, gear 86 and gear train 88. It is to be noted that when drum 91 is rotated by energizing motor 85 the speed reduction is the product of the reductions obtained by each gear train.

A cable 92 is wound on drum 91 and passes under sheave 48, over sheave 46 and under sheave 72, its end being anchored to hook 44. When cable drum 91 is rotated in one direction the length of the cable is increased and mold carriage 55 moves downwardly relative to channels 35, when cable drum 91 is rotated in the opposite direction the length of the cable is shortened and mold carriage 55 is raised relative to channels 35. Hoist arrangement 83, drum 91 and sheave 48 are so located that the vertical run of cable 92 between sheave 48 and cable drum 91 is coaxial with shaft 29. With this vertical run of cable 92 so disposed, mold support arrangement 26 may be swung in either direction without lengthening or shortening cable 92 and affecting the position of mold carriage 55.

Figure 9:
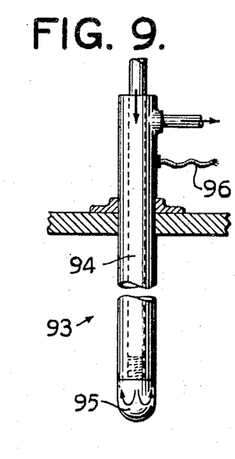

On a platform above the path of mold carriage 55 is supported an electrode arrangement 93. As shown in Fig. 9 electrode arrangement 93 includes a hollow body portion 94 to which is united a copper tip 95. Water, or other cooling medium, enters body portion 94 through a central tube to discharge against the inner wall of tip 95. The water or other cooling medium leaves through a tube at the top of body portion 94. Electrode arrangement 93 may be called the finishing electrode and is connected through cable 96 to the negative side of a source of direct current. Electrode arrangement 93 is located on the arc defined by the center of the mold as it is swung about shaft 29. Tip 95 is so vertically positioned that when the mold is raised sufficiently it will enter the mold. As shown in Fig. 2, an electrode arrangement 93 is positioned above each of mold supporting arrangements 26 and 26'.

As best shown in Fig. 6, on one of vertical channels 35, adjacent the upper end thereof, is mounted a switch arrangement 97 having a pivoted arm 98 terminating in a roller. A similar switch 97 is mounted adjacent the lower end of the channel 35. Switches 97 are cut into the electric circuits of motors 84 and 85 in such a way that when arms 98 are moved to open the respective switches the circuits of the motors are opened and the movement of carriage 55 stopped. Cam arrangements 99 are mounted adjacent the top and the bottom of the one of vertical angles 75 adjacent the vertical channel 35 upon which switches 97 are mounted. The top switch 97 and its cooperating cam arrangement 99 are so positioned on their respective members that when mold carriage 55 is raised to a desired height the raising movement will automatically be ended. The bottom switch 97 and its cooperating cam arrangement 99 are so positioned on their respective support members that when carriage 55 is lowered to the lowest desired position the lowering movement will be ended.

A cutting device 99 is supported from a convenient member 11 of supporting structure 10, see Fig. 2, at such a level that its cutting element 100, an abrasive cutting disc, a metal saw disc, etc., may be brought into contact with electrode 15 to cut off the end thereof at a predetermined fixed distance below the lower end of contact device 20. Cutting device 99 includes a suitable motor 101, either air or electric, for driving the cutting disc 100. As shown, device 99 is so mounted that the cutting element 100 is reciprocated into and out of cutting position, if preferred, device 99 may be so mounted that the cutting element 100 is swung into and out of cutting position.

The position of cutting disc 100 determines the position of the top switch 97 and its cooperating cam 99. The cutting disc 100, the top switch 97 and the top cam 99 are so positioned on their respective supports that when mold carriage 55 is stopped in its upward movement by the action of switch 97, the cut end of electrode 15 will be spaced from the bottom of the metal shaping surface of mold bottom element 77 by the distance required for starting the metal producing operation.

Prior to initiating the metal producing operation, metering device 13, motor 17 which drives the electrode forming and feeding rolls, and the current supply which is carried to contact device 20 by cable 22, are adjusted as set forth in my prior Patent No. 2,191,479 as required to produce metal of the desired analysis at a desired rate. Motors 84 and 85 are set to raise and lower carriage 55 at the desired rates; motor 84 being set to raise and lower carriage 55 at a rapid rate and motor 85 being set to lower carriage 55 at a rate to maintain a constant spacing between the end of contact device 20 and the surface of the molten metal. The circuit of motor 17 is closed to form and feed electrode 15. When the end of electrode 15 extends well beyond the position required at the beginning of the operations the circuit of motor 17 is opened and cutting device 99 moved into cutting position to sever the end of electrode 15. The severed end of electrode 15 will thus be accurately located in the position required at the start of the operation. A wad of steel wool or other arc starter is then inserted in the end of electrode 15.

Mold support arrangement 26 will be considered as being in the dotted line position shown in Fig. 2. It will also be supposed that the mold carried by molten support arrangement 26 has been prepared for the metal producing operation and that the water circulation through the various jackets of the mold has been started. Mold support arrangement 26 is then moved to the solid line position of Fig. 2 and lever 52 operated to move pin 51 into the hole in channel 54, thus fixing the mold in registry with electrode 15.

A quantity of granular metallic material, either of the desired metal or the constituents of the desired metal, is poured into the bottom of the mold. The quantity of granular material employed should be sufficient to start the operation and rapidly form a molten metal pool of a depth sufficient to protect the metal shaping surface of mold bottom 77 from the electric current discharge. The circuit of motor 84 is then closed to raise mold carriage 55 at a comparatively rapid rate until the top one of cams 99 contacts the top one of arms 98 to open the circuit of motor 84. When this happens the end of electrode 15 will be accurately spaced, as required, from the bottom of the metal shaping surface of mold bottom 77. A proper quantity of flux is then placed into the mold.

The electric circuit of electrode 15 may then be closed and the metal producing operation begun. The initial surge of current will destroy the arc starter to establish a discharge gap between the end of the electrode and the granular material in the mold bottom. As the operation progresses the heat generated by the electric current discharge across the gap mentioned will fuse the electrode and granular material as supplied to form a pool of molten metal of the desired analysis. At the same time, or shortly after, that the circuit of electrode 15 is closed, the circuit of motor 85 is likewise closed to lower mold carriage 55 at a constant rate chosen to maintain the level of the liquid metal in the mold at a constant distance from the bottom of contact device 20. By reason of the water circulated through the mold, the produced metal is progressively solidified as explained in my prior Patent No. 2,191,479. When the required quantity of metal has been produced the circuit of motor 85 may be opened to stop the further downward movement of mold carriage 55. At this time the circuit of electrode 15 is also opened.

The circuit of motor 84 is then closed to rapidly lower carriage 55 to such a position that the mold may be swung from beneath the electrode to the dotted line position of Fig. 2. The circuit of motor 84 will, of course, be reopened when this position of the mold has been attained. When the mold support arrangement 26 has been brought to the dotted line position, handle 52 will again be moved to insert pin 51 into the hole in channel member 54 to firmly position the mold beneath the finishing electrode 93. The circuit of motor 84 will then again be closed to raise the mold at a rapid rate until the surface of the molten flux approaches the discharge tip of electrode 93. The circuit of motor 84 will then be opened and that of motor 85 closed to raise mold carriage 55 at a slow rate and immerse the discharge tip into the molten flux. The circuit of motor 85 is opened when the volt meter indicates that the discharge through the gap between the electrode tip 95 and the surface of the molten metal is of the desired voltage. The electric current discharge will be continued until substantially all of the metal in the mold is solidified. By means of this heat input shrinkage defects such as pipes and segregations are eliminated. When the metal is completely solidified the circuit of motor 84 is again closed to lower carriage 55 away from finishing electrode 93. This downward movement is usually allowed to continue until the bottom one of cams 99 actuates the bottom one of switches 87. When in this position the mold support arrangements are actuated to raise the mold body portion 81 off mold bottom 77. Frames 82 are then separated to separate the halves of mold body 81 so that the formed metal body may be removed.

While the finishing operation just described is going on, cutting device 99 is moved to again sever the end of the electrode 15 and, after this is done, mold support arrangement 26' is swung beneath electrode 15 and the metal producing operation, above described, carried out in its mold. While metal is being deposited in the mold carried by mold support arrangement 26' the mold carried by mold support arrangement 26 is put in condition for the next metal producing operation. When the metal producing operation is completed in the mold carried by mold support arrangement 26', mold support arrangement 26' is swung to place its mold beneath its finishing electrode 93 and the metal finishing operation carried out therein. The end of the electrode 15 is again severed and the mold carried by mold support arrangement 26 swung and positioned beneath electrode 15 to begin another metal depositing operation. This sequence is continued indefinitely.

It should be apparent that by reason of the arrangement disclosed the metal producing operation is carried on substantially continuously with a minimum interruption and that any apparatus adjustments necessary are carried out automatically without chance of upsetting conditions which will affect the quality of the metal.

I claim:

1. In apparatus for producing metal bodies by subjecting raw materials of the desired metal to the discharge of electric current through a gap, a fusible electrode, a supporting structure, means fixedly positioned on said structure for feeding said electrode along a substantially vertical path, means movable into said path at a substantially fixed vertical distance from said feeding means for severing said electrode, a mold, swingable means supporting said mold adapted to move said mold into registry with said electrode path, means for raising and lowering said mold relative to said fixedly positioned means, and means for terminating the upward movement of said mold in a position in said path to provide a predetermined spacing between the severed end of said electrode and the bottom of said mold.

2. In apparatus for producing metal bodies by subjecting raw materials of the desired metal to the discharge of electric current through a gap, a supporting structure, a fusible electrode, means fixedly positioned on said structure for feeding said electrode along a substantially vertical path, means movable into a substantially fixed point in said path for severing said electrode whereby the end of said electrode is accurately positioned relative to said feeding means, a mold, swingable means adapted to move said mold into registry with said electrode path, means for accurately locating said mold in registry with said electrode path, means for raising and lowering said mold, and means for terminating the upward movement of said mold in a position in said path to provide a predetermined spacing between the severed end of said electrode and the bottom of said mold.

3. In apparatus for producing metal bodies by subjecting raw materials of the desired metal to the discharge of electric current through a gap, a supporting structure, a fusible electrode, means fixedly positioned on said structure for feeding said electrode along a substantially vertical path, means movable into a substantially fixed point in said path for severing said electrode whereby the severed end of said electrode is accurately positioned relative to said feeding means, a mold, swingably supported means carrying said mold, said swingably supported means being adapted to carry said mold through a path that passes beneath the vertical path of said electrode, means for accurately locating the position of said swingably supported means in which said mold is in registry with the path of said electrode, means for locking said swingably supported means in said position, means for raising and lowering said mold, and means for terminating the upward movement of said mold at a point to provide a predetermined spacing between the bottom of said mold and the severed end of said electrode.

4. In apparatus for producing metal bodies by subjecting raw materials of the desired metal to the discharge of electric current through a gap, a supporting structure, a fusible electrode, means fixedly positioned on said structure for feeding said electrode along a substantially vertical path, a mold, swingable means supporting said mold adapted to move said mold into registry with said electrode path, means for raising and lowering said mold relative to said fixedly positioned means and said swingable means, and means for discharging electric current through a gap between the end of said electrode and metal surface in said mold to fuse said electrode, said means for lowering and raising said mold including means for lowering said mold as required to maintain said gap substantially fixed in position.

5. In apparatus for producing metal bodies by subjecting raw materials of the desired metal to the discharge of electric current through a gap, a supporting structure, means fixedly positioned on said structure for feeding said electrode along a substantially vertical path, means movable into said path at a substantially fixed vertical distance from said feeding means for severing said electrode to provide the end of the electrode at a fixed distance from said feeding means, a mold, swingable means supporting said mold adapted to move said mold into registry with said electrode path, means for raising and lowering said mold relative to said fixedly positioned means, means for terminating the upward movement of said mold at a point to provide a predetermined distance between the severed end of said electrode and the bottom of said mold, and means for discharging electric current through a gap between the end of said electrode and metal surface in said mold to fuse said electrode, said means for lowering and raising said mold including means for lowering said mold as required to maintain said gap substantially fixed in position.

6. In apparatus for producing metal bodies, a pair of electrodes spaced apart along an arc, one of said electrodes being fusible and made of one or more of the components of the desired metal to provide molten metal in said mold, the other of said electrodes being substantially indestructible, a mold, means pivoted for swinging movement about an axis aligned with the center of said arc adapted to carry said mold from one to another of said electrodes, means for accurately determining the position of alignment of said mold with each of said electrodes, and means adapted to engage said position determining means for locking said pivoted means in each of the positions of alignment of said mold.

7. In apparatus for producing metal bodies, a pair of electrodes spaced apart along an arc, a mold, means pivoted for swinging movement about an axis aligned with the center of said arc adapted to carry said mold from one to another of said electrodes, a third electrode spaced along an arc that intersects said first-mentioned arc at the location of one of the electrodes of said pair of electrodes, a second mold, and means pivoted for swinging movement about an axis aligned with the center of said second mentioned arc adapted to carry said second mold from one to another of said electrodes spaced on said second mentioned arc.

8. In apparatus for producing metal bodies, a pair of electrodes spaced apart along an arc, a mold, means pivoted for swinging movement about an axis aligned with the center of said arc adapted to carry said mold from one to another of said electrodes, means for accurately determining the position of alignment of said mold with each of said electrodes, means adapted to engage said position determining means for locking said pivoted means in each of the positions of alignment of said mold, a third electrode spaced along an arc that intersects said first-mentioned arc at the location of one of said electrodes of said pair of electrodes, a second mold, means pivoted for swinging movement about an axis aligned with the center of said second mentioned arc adapted to carry said second mold from one to another of said electrodes spaced on said second mentioned arc, means for accurately determining the position of alignment of said second mold with each of said electrodes spaced on said second mentioned arc, and means adapted to engage said last mentioned position determining means for locking said pivoted means carrying said second mold in each of the positions of alignment of said second mold.

9. In apparatus for producing metal bodies, a pair of electrodes spaced apart along an arc, one of said electrodes being fusible and made of one or more of the components of the desired metal to provide molten metal in said mold, the other of said electrodes being substantially indestructible and adapted to be used to supply heat only to the metal in said mold, means pivoted for swinging movement about an axis aligned with the center of said arc adapted to carry said mold from one to another of said electrodes, a third electrode spaced along an arc that intersects said first-mentioned arc at the location of said fusible electrode, said third electrode being substantially indestructible and adapted to be used to supply heat only, a second mold, and means pivoted for swinging movement about an axis aligned with the center of said second-mentioned arc adapted to carry said second mold from one to another of said electrodes spaced on said second-mentioned arc.

10. In apparatus for producing metal bodies, a pair of electrodes spaced apart along an arc, one of said electrodes being fusible and made of one or more components of the desired metal to provide molten metal in said mold, the other of said electrodes being substantially indestructible and adapted to be used to supply heat only to the metal in said mold, means pivoted for swinging movement about an axis aligned with the center of said arc adapted to carry said mold from one to another of said electrodes, means for accurately determining the position of alignment of said mold with each of said electrodes, means adapted to engage said position determining means for locking said pivoted means in each of the positions of alignment of said mold, a third electrode spaced along an arc that intersects said first-mentioned arc at the location of said fusible electrode, said third electrode being substantially indestructible and adapted to be used to supply heat only, a second mold, means pivoted for swinging movement about an axis aligned with the center of said second-mentioned arc adapted to carry said second mold from one to another of said fusible electrode and said third electrode, means for accurately determining the position of alignment of said second mold with said fusible electrode and said third electrode, and means adapted to engage said last-mentioned position determining means for locking said pivoted means carrying said second mold in each of the positions of alignment of said second mold.

11. In apparatus for producing metal bodies, a support structure, a frame pivotally mounted on said structure for swinging movement about a vertical axis, a carriage supported on said frame for vertical movement relative thereto, a mold mounted on said carriage for movement therewith whereby said mold may be swung on an arc from one to another of several operating positions, and means for raising and lowering said carriage relative to said frame whereby said carriage may be raised and lowered relative to apparatus elements employed at the several operating positions.

12. In apparatus for producing metal bodies, a support structure, a vertically disposed shaft carried by said support structure, an elongated member supported for rotation on said shaft, a frame, means uniting said frame to said elongated member whereby said frame may be swung about said shaft as on axis, a carriage member mounted on said frame for vertical movement relative thereto, a mold supported on said carriage, and means for raising and lowering said carriage.

13. In apparatus for producing metal bodies, a support structure, a vertically disposed shaft carried by said support structure, an elongated member supported for rotation on said shaft, a frame including vertically disposed guide means, means uniting said frame to said elongated member whereby said frame may be swung about said shaft as an axis, a carriage mounted on said frame for vertical movement relative thereto, said carriage including roller means adapted to bear on said guide means, a mold supported on said carriage, and means for raising and lowering said carriage.

14. In apparatus for producing metal bodies, a support structure, a frame member supported from said structure for swinging movement about a vertical axis, said frame including a pair of spaced vertically disposed guide members, each of said guide members provided with a pair of vertically disposed guideways transversely spaced from each other, the guideways of one of said guide members being in the same planes as the corresponding guideways of the other of said guide members, a carriage vertically movable relative to said guide members supported from said frame, said carriage having rollers attached thereto adjacent its top end adapted to contact the guideways in one plane and rollers attached thereto adjacent its bottom end adapted to contact the guideways in the other plane, a mold supported on said carriage and means for raising and lowering said carriage.

15. In apparatus for producing metal bodies, a support structure, a frame member supported from said structure for swinging movement about a vertical axis, said frame including a pair of spaced vertically disposed guide members, each of said guide members being provided with a pair of vertically disposed guideways transversely spaced from each other, the guideways of one of said guide members being in the same planes as the corresponding guideways of the other of said guide members, a carriage vertically movable relative to said guide members supported from said frame, said carriage having rollers attached thereto adjacent its top end adapted to contact the guideways in one plane and rollers attached thereto adjacent its bottom end adapted to contact the guideways in the other plane, rubbing members attached to said carriage adjacent its ends adapted to contact the guideways not contacted by the rollers at the same end of said carriage when said carriage is canted to carry said rollers off said guideways, a mold supported on said carriage, and means for raising and lowering said carriage.

16. In apparatus for producing metal bodies, a support structure, a frame member supported from said structure for swinging movement about a vertical axis, said frame including a pair of spaced vertically disposed guide members, each of said guide members being provided with a pair of vertically disposed guideways transversely spaced from each other, the guideways of one of said guide members being in the same planes as the corresponding guideways of the other of said guide members, a carriage vertically movable relative to said guide members supported from said frame, said carriage having rollers attached thereto adjacent its top end adapted to contact the guideways in one plane and rollers attached thereto adjacent its bottom end adapted to contact the guideways in the other plane, rubbing members attached to said carriage adjacent its ends adapted to contact the guideways not contacted by the rollers at the same end of said carriage when said carriage is canted to carry said rollers off said guideways, a sheave mounted on said carriage intermediate the ends thereof, a hoist arrangement including a cable supported on said structure above said frame, said cable passing over said sheave and having one end anchored to the top of said frame, and a mold supported on said carriage.

17. In apparatus for producing metal bodies a supporting structure, a frame supported from said structure for swinging movement about a vertical axis, a carriage vertically movable relative to said frame, means for guiding said carriage in its vertical movement, a hoist arrangement including a cable drum positioned on said structure above said frame, a hoist cable having one end anchored to said drum, a cable sheave mounted on said carriage, a plurality of cable sheaves mounted on said frame, one of said sheaves being positioned adjacent the top of said frame, said cable having its other end anchored to said frame adjacent the top thereof, said cable passing from its anchor point under said sheave mounted on said carriage and over said sheave positioned adjacent the top of said frame, another of said sheaves of said plurality of sheaves and said cable drum being positioned with their peripheries substantially tangent to the extension of said vertical axis, said cable passing from said drum under said latter sheave whereby said frame may be swung about its axis without affecting the position of said carriage.

18. In apparatus for producing metal bodies, a supporting structure, a frame supported from said structure for swinging movement about a vertical axis, a mold carriage vertically movable relative to said frame, means for guiding said carriage in its vertical movement, said guiding means including vertical members, a hoist arrangement including electrically operated motor means for vertically moving said carriage, a switch having a pivoted operating arm extending therefrom positioned on one of said vertical members, said switch being operatable to deenergize said electrically operated motor means, means mounted on said mold carriage adapted to contact said operating arm to swing it about its pivot into circuit opening position, said contact means and said switch being positioned to deenergize said motor means when said mold carriage attains a predetermined position in its path of movement.

19. In apparatus for producing metal bodies, a supporting structure, a frame supported from said structure for swinging movement about a vertical axis, a mold carriage vertically movable relative to said frame, means for guiding said carriage in its vertical movement, said guiding means including vertical members, a hoist arrangement including electrically operated motor means for vertically moving said carriage, a pair of switches each having a pivoted operating arm extending therefrom positioned on one of said vertical members, each of said switches being operatable to deenergize said electrically operated motor means, one of said switches being positioned adjacent the upper end and the other of said switches being positioned adjacent the lower end of said one of said vertical members, a pair of contact shoes mounted on said mold carriage, one of said contact shoes being positioned adjacent the upper end and the other of said shoes being positioned adjacent the lower end of said mold carriage, said contact shoes being adapted to engage the pivoted arm of said switches to swing them into position to deenergize said electrically operated motor means, the upper switch and the upper contact shoe being positioned to deenergize said motor means when said mold carriage attains a predetermined upper position, the lower switch and lower contact shoe being positioned to deenergize said motor means when said mold carriaige attains a predetermined lower position.

ROBERT K. HOPKINS.